UNITED STATES PATENT OFFICE.

RUDOLPH D'HEUREUSE, OF SAN FRANCISCO, CALIFORNIA.

IMPROVED PROCESS OF EXTRACTING GOLD FROM ITS ORES.

Specification forming part of Letters Patent No. 76,413, dated April 7, 1868.

*To all whom it may concern:*

Be it known that I, RUDOLPH D'HEUREUSE, of the city and county of San Francisco, in the State of California, have invented a new and Improved Process for Extracting Gold; and I do hereby declare that the following is a full, clear, and exact description thereof, which will enable those skilled in the art to understand and use the same.

This invention relates to a new and improved method or process of extracting and separating gold from the foreign matter or particles with which it may be combined; and it consists in subjecting gold-bearing substances to the action of melted zinc in the manner hereinafter described.

In carrying out my invention and discovery, I proceed as follows: The quartz, or earth, or other gold-bearing substance is first reduced to a fine or impalpable powder, so that the particles of gold may be readily acted upon by the zinc. In a deep metallic pot or crucible, of suitable size, I melt the requisite quantity of zinc, and then, by a tube or by any other means, I gradually introduce the gold-bearing powder into the melted zinc near to the bottom of the mass, or as far from the surface as possible, so that the zinc may at once attack the gold particles and combine therewith by dissolving them or otherwise. This it will readily do, while the refuse substances with which the gold was previously combined will rise to the surface of the melted zinc, from whence they may be removed by skimming. The introduction of the gold-bearing powder into the melted zinc is continued until the zinc becomes loaded with the gold, or as long as the skimming can be continued without withdrawing the gold, after which the zinc is allowed to cool, and is treated with sulphuric or hydrochloric acid, which dissolves the zinc, while the gold remains at the bottom of the vessel in the form of powder or gold-dust. The zinc may be expelled from the gold by "retorting," or in a manner similar to the use of quicksilver amalgam.

The advantages of this method are that the gold is much more perfectly and readily separated thereby than by the use of quicksilver, and at a much cheaper rate.

Having thus described my invention, I claim as new and desire to secure by Letters Patent—

The process herein described for extracting gold by passing gold-bearing substances, reduced to a fine powder, without previous alloy, through melted zinc by introducing said substances below the surface of the melted zinc, as set forth.

Signed by me this 4th day of November, A. D. 1867.

RUDOLPH D'HEUREUSE.

Witnesses:
    E. F. OHM,
    E. V. SUTTER.